May 12, 1925.
J. R. PADESKY
PRESSURE GAUGE
Filed May 2, 1924
1,537,184
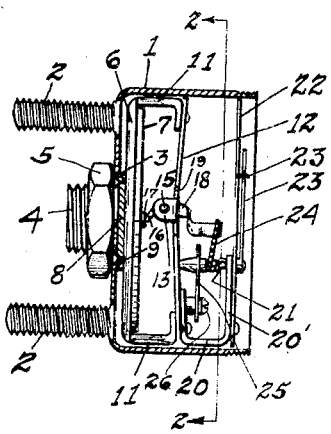
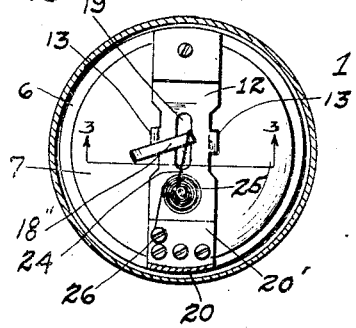
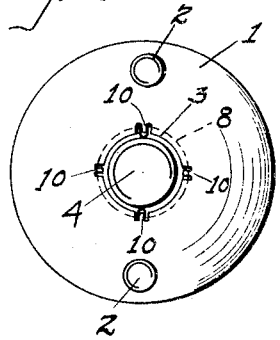
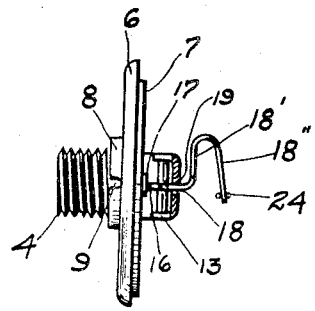
Inventor
John R. Padesky.
Attorneys Patented May 12, 1925.

1,537,184

UNITED STATES PATENT OFFICE.

JOHN R. PADESKY, OF LA CROSSE, WISCONSIN, ASSIGNOR TO NATIONAL GAUGE & EQUIPMENT COMPANY, OF LA CROSSE, WISCONSIN, A CORPORATION OF WISCONSIN.

PRESSURE GAUGE.

Application filed May 2, 1924. Serial No. 710,642.

*To all whom it may concern:*

Be it known that I, JOHN R. PADESKY, a citizen of the United States, residing at La Crosse, in the county of La Crosse and State of Wisconsin, have invented certain new and useful Improvements in Pressure Gauges, of which the following is a specification.

This invention relates to improvements in pressure gauges, the type of gauge illustrated being one particularly intended for measuring the quantity of fuel in the fuel tanks of automobiles, although the improvements are not necessarily limited to that particular type of gauge.

The object of my invention is to improve the means for connecting the pressure responsive element with the indicator hand whereby the parts may be readily adjusted and calibrated.

A further object of the invention is to provide improved means for interlocking the support for the operating parts of the instrument with the casing to properly position the operating parts in the casing.

Referring to the drawings:

Fig. 1 is a vertical section through the enclosing casing showing the operating parts in elevation, portions of the casing being omitted.

Fig. 2 is a section on the line 2—2 of Fig. 1.

Fig. 3 is a section on the line 3—3 of Fig. 2.

Fig. 4 is a view of the rear end of the instrument with the nut removed.

Referring to the drawings, 1 is a casing with the front cap and glass covering removed. The rear end of this casing has the usual threaded studs 2 by which the instrument may be secured in position on the instrument board and also has a central opening 3 to receive the threaded nipple 4 which projects from the support for the operating parts so that such parts may be firmly clamped in position by the nut 5. In the present instrument the threaded nipple 4 projects from the rear side of a circular cup-shaped member 6 the forward side of which is closed by a diaphragm 7 to form a pressure responsive element. The nipple is formed by reducing and threading the rear portion of a circular boss 8 which is suitably secured to the wall of the member 6, and the rear face of this circular boss is provided with a pair of diametrically-opposite recesses 9. The casing about the opening 3 is cut to provide a series of equally-spaced spring tongues 10. Four of these tongues are shown in the present instance equally-spaced apart and before the parts are assembled two of the tongues are bent slightly forward so that they will enter the recesses 9 when the parts are clamped together so as to interlock the parts.

The member 6 has connected therewith a pair of forwardly-extending, oppositely-arranged brackets 11, connected by a bridge 12. Projecting rearwardly from the central portion of the bridge are two ears 13 which form bearings for a pivot pin 15. The pin 15 has a short rearwardly-extending crank arm 16 which cooperates with a button 17 carried by the central portion of the diaphragm 7. The pin also has a long finger 18 which projects forwardly through a slotted opening 19 in the bridge is bent laterally as indicated at 18′ and formed with a return bend so as to extend substantially in the opposite direction as indicated at 18″.

Secured to the lower portion of the bridge 12 is a bracket 20 which projects forwardly and thence upwardly as indicated at 20′. A longitudinally-extending spindle 21 perpendicular to the diaphragm has its forward end journaled in the upper portion of the bracket part 20′ and its rear end journaled in the bridge 12. The forward end of the spindle projects through a dial plate 22 which is secured to the bracket 20′ and has fastened to its front end an indicator hand 23 to cooperate with the dial. The free end of the portion 18″ of the finger lies substantially at right-angles to the axis of the spindle and has connected therewith a small chain 24 which is wound about and connected with the spindle. A coil spring 25 has one end connected with the spindle and the other end secured by a screw 26 to the bracket 20, this spring serving to hold the indicator hand in zero position, against a stop pin 23′ projecting from the dial. Movement of the diaphragm acts through the small crank arm 16 to swing the free end of the finger part 18″ in a general vertical direction which movement through the chain imparts a rotary movement to the spindle.

The bridge 12 is formed of metal of a character which may be readily bent and the finger 18 is also of the readily bendable material. To calibrate, therefore, the necessary adjustments may be readily made by bending the bridge to properly position the short crank arm 16 with relation to the diaphragm button 17, and in this calibration the position of the pivot or fulcrum is varied, but by bending the part 18″ of the finger to reduce or enlarge the space between the parts 18′ and 18″ the effective length of the finger 18 can thereby be shortened or lengthened, and in this way a very accurate method of calibration is obtained, and in each case the slack in the chain may be taken up.

Having thus described my invention, I claim:

1. In a gauge, a pressure responsive element, a spindle mounted to oscillate, an indicator hand on said spindle, a support, a finger pivoted to said support, a crank arm connected with said finger and cooperating with said pressure element, a flexible connection between the free end of said finger and said spindle, and a spring connected with said spindle for holding said indicator hand in zero position, said support being of bendable material whereby bending of the support serves to cause the crank arm, by contact with said pressure responsive element, to oscillate said finger and take up slack in said flexible connection.

2. In a gauge, a pressure responsive element, a spindle mounted to oscillate, an indicator hand on said spindle, a support, a finger pivoted on said support, a crank arm connected with said finger and cooperating with said pressure responsive element, the free end of said finger being extended at substantially right angles to the axis of said spindle and being of bendable material whereby it may be properly positioned with respect to said spindle, and a flexible connection between the free end of said finger and said spindle, said support being of bendable material whereby the bending of the support serves to oscillate said crank arm to cooperate with the pressure responsive element to oscillate the finger to take up slack in said flexible connection.

3. In a gauge, a pressure responsive diaphragm, a spindle mounted to oscillate and arranged perpendicular to said diaphragm, an indicator hand on said spindle, a spring connected with said spindle to hold said indicator hand in zero position, a support, a finger pivoted to said support and projecting forwardly therefrom, thence laterally and provided with a return bend so that the free end of said finger lies in a plane substantially at right-angles to the axis of said spindle, and a flexible connection between the free end of said finger and said spindle, said support being of a bendable character whereby bending of the same causes the crank arm to cooperate with the diaphragm to oscillate said finger to take up slack in said flexible connection, the free end of said finger being of a bendable character to allow the same to be positioned in proper relation with said spindle.

In testimony whereof, I have hereunto set my hand this 7th day of April, 1924.

JOHN R. PADESKY.